May 18, 1937.  A. WINTHER  2,081,028

CLUTCH

Filed June 21, 1935

Anthony Winther,
Inventor.
Delos G. Haynes,
Attorney.

Patented May 18, 1937

2,081,028

UNITED STATES PATENT OFFICE 2,081,028

CLUTCH

Anthony Winther, Kenosha, Wis.

Application June 21, 1935, Serial No. 27,617

7 Claims. (Cl. 192—46)

This invention relates to clutches, and with regard to certain more specific features, to an over-running clutch.

This invention is an improvement upon the structure shown in my United States Patent 1,849,212, dated March 15, 1932.

Among the several objects of the invention may be noted the provision of an over-running clutch that will positively deliver full power from one rotating element to another without depending upon friction to transmit the force, and which will release immediately at the instant when there is the slightest tendency for the driven parts to over-run the driving parts; the provision of a clutch of the class described which will function instantaneously and positively to pick up the load every time it is called upon to do so regardless of varying temperatures, lubricant viscosity, and like conditions; and the provision of a clutch of the class described which comes into driving engagement smoothly and without the so-called "power thump". Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawing, in which is illustrated one of various possible embodiments of the invention, Fig. 1 is a longitudinal section showing the application of the clutch between a driving and a driven gear;

Similar reference characters indicate corresponding parts throughout the several views of the drawing.

While the clutch shown in said Patent 1,849,212, is superior to clutches prior thereto, when that type of clutch is used in automotive transmission apparatus such as described in United States Patent 1,986,037 of A. Winther et al., dated January 1, 1935, a high degree of perfection in performance and permanence is desirable, and this invention provides the improvements to bring this about.

Figure 1:
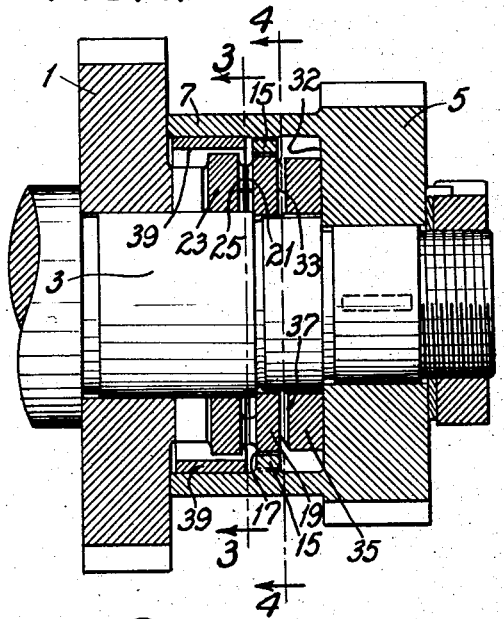

Referring now more particularly to Fig. 1, there is shown at numeral 1 a driving gear which is rotatably carried upon a stud 3, the latter having locked thereon a driven gear 5. It is to be understood that the gears 1 and 5 are exemplary of any driving and driven members respectively. Fashioned with the driven gear 5 is a housing 7 which encloses the clutch parts.

Forming part of the driving member 1 is a peripheral set of sloping, undercut, crown teeth or wedges 9 extending helically and having forward sloping faces 11 and rearward undercut faces 13. The terms "forward" and "rearward" are used relatively to the direction of angular rotation of the member 1 when it is driving in the direction shown by the single-headed arrow of Fig. 2.

Internally, the housing 7 carries splined teeth 15 which cooperate with corresponding external splined teeth 17 on a loose or axially movable, driven ring 19. Thus, the loose, driven ring 19 and the finally driven member 5 must at all times rotate at the same angular velocity, although the ring 19 has endwise, linear play with respect to the member 5; that is, they are splined.

The left-hand face of the loose, driven ring 19 (referring to Figs. 1 and 2) is provided with radial serrations 21 having a mean pitch of approximately $\frac{1}{32}$ of an inch, and of about an equal depth, although these dimensions are not be considered as limiting but merely to show the nonfrictional character of certain driving contacts therein, to be particularized hereinafter.

At numeral 23 is shown an intermediate drive or wedge ring which is freely rotatable on the stud 3 and which on its right-hand face has radial serrations 25 which correspond to, and engage with the serrations 21 on the ring 19.

On its left-hand face, the intermediate ring 23 carries undercut notches 27 having forward driven faces 29 which cooperate with the driving faces 11, and rearward retraction faces 31 which cooperate with the faces 13. The driving and driven faces 11 and 29 respectively have a wedge angle of approximately 20 degrees, and the retraction faces 13 and 31 have an angle of approximately 45 degrees. The fact that the former angle is less than the latter provides a positive wedging shut of the parts for positive driving and at the same time a quick and sensitive opening action, as will be clear from the following.

The form of the right-hand face 33 of the loose, driven ring 19 is more or less inconsequential, though it should preferably be flat; likewise, the inner face 32 of the member 5. Between faces 32 and 33 is a load reaction spring 35 having a circular form with axially directed wave formations 37 therein.

At numeral 39 is shown a damper spring which has an inwardly turned lip 41 slidably engaging a notch 43 in the loose, intermediate ring 23 so that the ring 23 and the spring 39 necessarily have equal angular velocities but the ring 23 is permitted to slide axially within the spring. The lip 41 and notch 43 thus provide an anchor on the intermediate ring 23 for the spring 39.

Figure 3:
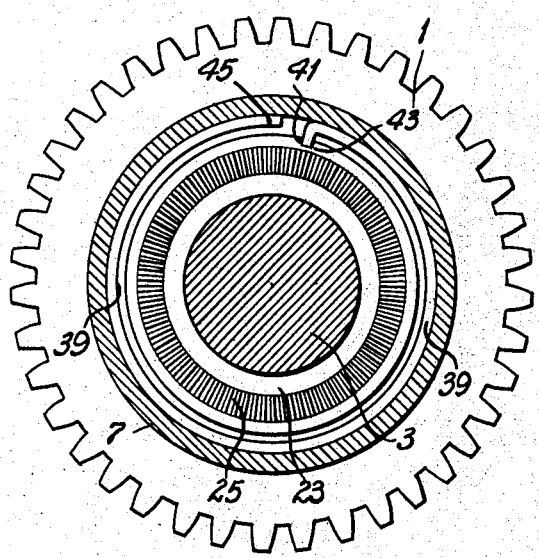
Fig. 3 is a vertical section taken on line 3—3 of Fig. 1.

The free form of the spring 39 is spiral, the same having a free end 45 so that when the spring is positioned in the inner cylindric cup formed by the housing 7, it is outwardly pressed against the inner cylinder at said cup and assumes approximately a cylindric form. Such a spring has the characteristic of tending to lock against the outer cylinder wall when turned relatively clockwise (Fig. 3), being self-energizing in respect to locking; and when turned relatively counterclockwise (Fig. 3) to permit free relative rotation with some, but little friction, between itself and the surrounding wall. Such a spring is sometimes called a Scotch-coil. A mechanical equivalent would comprise any device which is self-locking or highly frictional in one direction and self-releasing, but engendering some, but slight, friction in the reverse direction.

The particular improvements embodied in this construction arise from the use of the Scotch-coil type of spring or the equivalent, as described, and the use of the reaction spring 35 or its equivalent with the loose, driven member 19.

Figure 2:
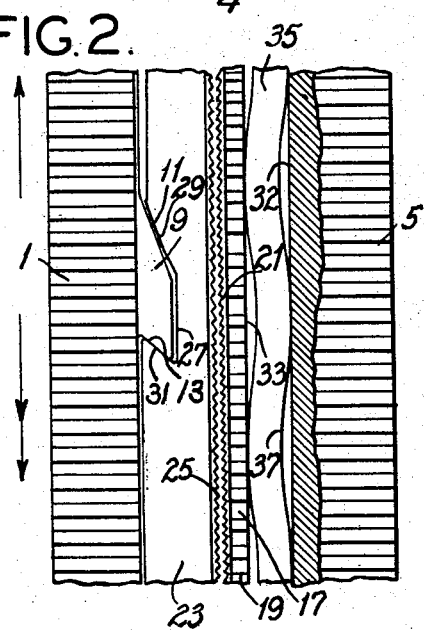
Fig. 2 is a diagrammatic development of peripheral portions of Fig. 1.
Figure 4:
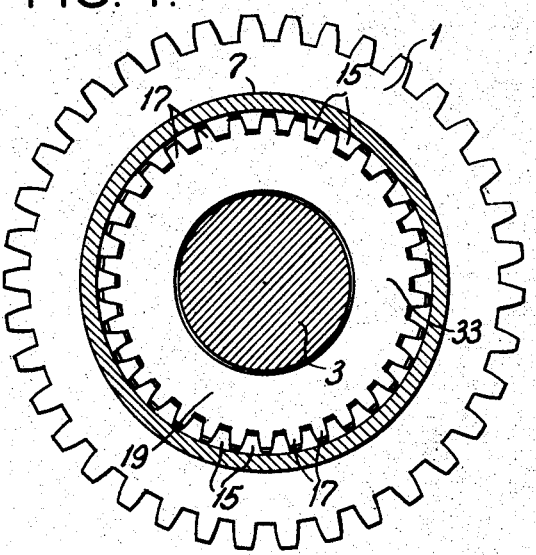
Fig. 4 is a vertical section taken on line 4—4 of Fig. 1.

Operation is described as follows in which description relative movement only of the driving and driven elements 1 and 5 will be considered, and in which all movements will be related to the functions of engagement and disengagement:

When the driver 1 moves relatively in the direction of the single-headed arrow shown in Fig. 2, the wedge teeth 9 will incipiently move so that their forward-driving faces 11 will instantly contact the faces 29 of the intermediate ring 23 and hence will tend to move the ring 23 angularly or axially or both. This incipiently moves the damper spring or Scotch-coil 39 clockwise (Fig. 3) thus causing it to effect a self-locking with respect to the housing 7. Thus, the incipient angular movement of the intermediate or wedge ring 23 is promptly resisted (see lip 41 and notch 43) so that there remains only the possibility of axial movement thereof. As a consequence, said ring 23 assumes an axial movement under the wedging action at faces 11, 29, thus causing serrations 25 to axially engage the serrations 21 of the loose, driven ring 19. The fact that the serrations 25 and 21 engage under axial movement only, accounts for the elimination of all clashing upon engagement.

It should be noted at this point that the spring 39 is not used for transmitting the energy from the driver to the driven member and hence is not subjected to the deleterious wear that such springs often are.

After the serrations 25 and 21 have been fully engaged, continuous movement of both rings 23 and 19 in an axial direction, under the driving, wedging action, is gradually and increasingly resisted by a tendency to flatten out the waves in the reaction spring 35. Thus, the undersirable "power thump" is prevented. The spring 35 reacts against the driven member 5. The splines 15 and 17 permit of the axial movement of the loose, driven ring 19 and still effect the transmission of power from said ring 19 to the housing 7 and thus to the driven member 5.

In view of the above, it will be seen that the driving force is transmitted through the faces 11 and 29 in the direction normal thereto, through the intermediate wedge ring 23, serrations 25, 21, axially loose, driven ring 19, splines 15, 17, housing 7 and to the driven member 5, which, being keyed to the stud 3, moves the same. The flatness or waviness of spring 35 is a function of the driving torque and the greater the torque, the more said spring flattens, and the less the torque, the more said spring returns to its initial wave-form. Thus it will be seen that under any variation in torque, up to maximum, the spring 35 provides a cushioned reaction which is conducive to smooth and silent performance.

When the driver moves relatively to the driven parts in the direction of the double-headed arrow shown in Fig. 2 (driven member over-running), then the loose, intermediate ring 23 is driven to over-run the driving member 1. The drive is first through serrations 21, 25 which initially causes the faces 31 of notches 27 to contact the faces 13 of the teeth 9 and sliding action along the said faces 31 and 13 picks the ring 23 out of engagement with the loose, driven ring 19; that is, the serrations 25 and 21 start to separate. As long as the serrations are in contact, a positive drive is effected from ring 19 to ring 23 so as to cause a sliding action along said faces 13 and 31.

It is not desirable that as the serrations separate, there occur a relative scraping action between the series 21 and the series 25. This is avoided by reason of the fact that the spring 39 is at this time moving with the housing 7, due to the frictional effect between it and the housing sufficient to carry around the ring 23 so as to prevent relative rotation between said loose ring 23 and the housing 7. Therefore the serrations 21 and 25 go completely out of contact with axial movement only, thus to complete the substantially linear withdrawing action of the ring 23 and provide a definite clearance between the serrations before relative angular movements occur between them. Such relative movements ultimately occur because the teeth 9 bottom in the recesses 27 and the frictional holding action between spring 39 and housing 7 is overcome and is supplanted by a slipping action. This slipping action is non-deleterious, being light and under low pressure, due to the characteristics of the Scotch-coil.

Among the advantages of the present invention over that shown in my said Patent 1,849,212, are in the provision of the loose, splined driven ring 19, which while transmitting energy to the driven member, nevertheless is axially movable; and the provision of the buffer or reaction spring 35 against which the movable ring 19 pushes under driving conditions.

Another advantage arises out of the use of the Scotch-coil type of spring 39. This coil or its equivalent provides an instantaneous braking action against driving rotation of the ring 23 under driving conditions, so that said ring is confined to axial movement for closing the clutch through serrations 25 and 21, but which at the same time provides friction (but only enough friction) under over-running conditions (without a braking action) to cause the ring 23 to be completely picked out of engagement at the serrations 25 and 21 by the action of the faces 31 and 13.

The teeth 9 and notches 27 are in effect male and female helical forms which have mechanical equivalents such as the bayonet-type of connection and the like, and of course, the mechanical equivalent of the spring 35 may also be used.

In view of the above, it will be seen that the several objects of the invention are achieved, and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A clutch comprising a driving member, an over-running driven member, an intermediate member having lost motion with respect to both driving and driven members, a member mounted for axial movement with respect to the over-running driven member but locked thereto for equal angular movements, said intermediate member and axially movable member having engageable and disengageable driving surfaces, cooperating means between the driving member and intermediate member adapted upon driving by the driving member to force the intermediate member to engage the axially movable member, and to separate these under over-running conditions, means between the intermediate member and the over-running driven member adapted to produce angular locking action between it and the over-running driven member under incipient driving conditions and frictional, but slipping action therebetween under over-running conditions, and resilient means backing the axially movable member adapted to eliminate shock upon contact between it and the intermediate member.

2. A clutch comprising a driving member, a driven member, an intermediate wedge member having lost motion with respect to both driving and driven members, a second axially movable member free of the driven member for axial movement but locked thereto for equal angular movement, said wedge member and second axially movable member having positively engageable driving surfaces, wedge means between the driving member and wedge member adapted upon driving by the driving member to force the wedge member to engage the second axially movable member, and to separate these under over-running conditions, a Scotch-coil between the intermediate member and the driven member adapted to produce locking action under driving conditions and frictional, but slipping action under over-running conditions, and resilient means between said axially movable member and the driven member.

3. A clutch comprising a driving member, an over-running driven member, an intermediate wedge member having lost motion in respect to both driving and driven members, an axially movable member, said intermediate member and axially movable member having engageable driving surfaces, cooperating means between the driving member and intermediate member adapted upon driving to force the intermediate member to engage the axially movable member, means adapted to separate these under over-running conditions, means between the intermediate member and the driven member adapted to produce a relatively high friction between it and the driven member under incipient driving conditions and a relatively low friction therebetween under over-running conditions, and means for buffing the force of engagement between the intermediate and axially movable members.

4. A clutch comprising a driving member, an over-running driven member, an intermediate member having lost motion with respect to both driving and driven members, an axially movable member, said intermediate member and axially movable member having engageable positively locking driving surfaces, cooperating wedge means between the driving member and intermediate member adapted upon driving by the driving member to force the intermediate member to engage the axially movable member, wedge means adapted to separate these under over-running conditions, and means between the intermediate member and the driven member adapted to produce a relatively high friction between it and the over-running driven member under incipient driving conditions and a relatively low friction therebetween under over-running conditions, the first-named wedge means having a sharper wedge angle than the second-named wedge means.

5. A clutch comprising a driving member, an over-running driven member, an intermediate member having lost motion with respect to both driving and driven members, an axially movable member, said intermediate member and axially movable member having engageable driving surfaces, cooperating wedge means between the driving member and intermediate member adapted upon driving by the driving member to force the intermediate member to engage the axially movable member, wedge means adapted to separate these under over-running conditions, means between the intermediate member and the driven member adapted to produce a relatively high friction between it and the driven member under incipient driving conditions and a relatively low friction therebetween under over-running conditions, the first-named wedge means having a sharper wedge angle than the second-named wedge means, and means for buffing the force of engagement between the intermediate and axially movable members comprising a spring between the axially movable member and the driven member.

6. A clutch comprising a driving member, a driven member, an intermediate member having lost motion with respect to both driving and driven members, an axially movable member free of the driven member for axial movement but locked thereto for equal angular movement, said intermediate and axially movable members having positively engageable driving surfaces, wedge means between the driving member and intermediate member adapted upon driving by the driving member to force the intermediate member to engage the axially movable member, and a second wedge means adapted to separate these under over-running conditions, a Scotch-coil between the intermediate and driven members adapted to produce relatively high friction under driving conditions and relatively low friction under over-running conditions, the first wedge means having a greater mechanical advantage than said second wedge means.

7. A clutch comprising a driving member, a driven member, an intermediate member having lost motion with respect to both driving and driven members, an axially movable member free of the driven member for axial movement but locked thereto for equal angular movement, said intermediate and axially movable members having positively engageable driving surfaces, wedge means between the driving member and intermediate member adapted upon driving by the driving member to force the intermediate member to engage the axially movable member, and a second wedge means adapted to separate these under over-running conditions, a Scotch-coil between the intermediate and driven members adapted to produce relatively high friction under driving conditions and relatively low friction under over-running conditions, the first wedge means having a greater mechanical advantage than said second wedge means, and means for buffing the force due to contact between the intermediate member and said axially movable member comprising a peripherally arranged spring between the axially movable member and the driven member, said spring having a wave form axially considered.

ANTHONY WINTHER.